United States Patent Office 3,437,670
Patented Apr. 8, 1969

3,437,670
PROCESS FOR PREPARING DIISOPROPYL-3,4-DIHYDROCOUMARINS
Jerome King, Fairlawn, N.J., assignor to Universal Oil Products Company, Des Plaines, Ill., a corporation of Delaware
No Drawing. Filed Dec. 9, 1966, Ser. No. 600,399
Int. Cl. C07b 27/00; C07d 5/36
U.S. Cl. 260—343.2
9 Claims This invention relates to a process for preparing diisopropyl-3,4-dihydrocoumarins and, more particularly to a process for preparing these compounds by condensing propylene with 3,4-dihydrocourmarin in the presence of a modified orthophosphoric acid catalyst.

Polyalkylated 3,4-dihydrocoumarins are valuable compounds having many industrial applications. Certain of these dihydrocoumarins, and particularly diisopropyl substituted dihydrocoumarins, have unique odor properties which render them particularly valuable in perfumery. For example, 5,7-diisopropyl-3,4-dihydrocoumarin possesses odor and fixative properties similar to the highly valuable, naturally occurring macrocyclic musks such as muskone or civitone. The literature, illustrated by United States Patent No. 3,144,467, has suggested that polyalkylated dihydrocoumarins may be prepared by condensing dihydrocoumarin with an alkylating agent such as an alcohol or an olefin at relatively low temperatures ranging up to about 80° C. in the presence of an acid catalyst, such as phosphoric or polyphosphoric acid. The preparation of diisopropyl dihydrocoumarin using propylene as the alkylating agent and conventional phosphoric acid catalysts has proved to be totally unsatisfactory, however, because the desired reaction either fails to take place or, when it does take place, the yield of product is too low for economic, commercial operation. It has now been discovered, however, that the preparation of diisopropyl dihydrocoumarins using propylene as alkylating agent may be readily achieved with yields approaching the theoretical by effecting the condensation at relatively elevated temperatures and in the presence of a modified orthophosphoric acid catalyst.

Accordingly, an object of this invention is to provide an improved process for preparing diisopropyl-3,4-dihydrocoumarins. Another object is to provide a process for preparing these compounds by condensing propylene with dihydrocoumarin in the presence of a modified orthophosphoric acid catalyst at relatively elevated temperatures whereby substantially theoretical yields are obtained readily and in an industrially desirable manner. These and other objects of this invention will be apparent from the following further detailed description thereof.

The condensation reaction of propylene and 3,4-dihydrocoumarin to prepare diisopropyl dihydrocoumarins is effected according to this invention in the presence of a modified orthophosphoric acid catalyst. As indicated, the use of this catalyst in combination with relatively elevated temperatures results in the obtainment of almost theoretical yields of the desired product. This modified orthophosphoric acid catalyst may be described quantitatively as a mixture of substantially anhydrous orthophosphoric acid and phosphorus pentoxide. As used herein, the term substantially anhydrous orthophosphoric acid means that there is a sufficient quantity of phosphorus pentoxide present in the catalyst mixture to theoretically convert any water present to orthophosphoric acid. Upon a stoichiometric basis the substantially anhydrous orthophosphoric acid portion of the catalyst mixture may also be described as 100 percent $H_3PO_4$ or, in terms of its phosphorus pentoxide equivalent content, as 72.4 weight percent phosphorus pentoxide. The quantity of the phosphorus pentoxide, calculated as $P_2O_5$, present in the catalyst mixture with the substantially anhydrous orthophosphoric acid is extremely important to the success of the catalyst mixture in effecting the condensation of the propylene and dihydrocoumarin. This amount of phosphorus pentoxide may range from about 2 to 12 percent based upon the total weight of the catalyst mixture with a more limited amount of from 4 to 10 percent being preferred, particularly to maximize the yield of diisopropyl dihydrocoumarins. While the modified orthophosphoric acid catalyst of this invention may be described quantitatively as a mixture of substantially anhydrous orthophosphoric acid and phosphorus pentoxide in the specific indicated proportions, the activity and effectiveness of the catalyst mixture in promoting the desired condensation reaction is also related to its manner of preparation. Accordingly, it is important in describing the catalyst mixture to also refer to the catalyst mixture in terms of its preparation. The reason that this is necessary may be due to the fact that the chemistry of mixtures of orthophosphoric acid and phosphorus pentoxide at the levels of concentration of the catalyst mixture of this invention is quite complex. Thus the actual chemical or physical composition of the catalytic mixture, and hence its catalytic activity, is in part a function of its manner of preparation.

In order that the catalytic mixture have the desired activity, it is preferred that it be prepared by adding phosphorus pentoxide to an aqueous orthophosphoric acid having, for example, an 80 to 85 weight percent concentration of acid. The amount of the phosphorus pentoxide added is adjusted to convert stoichiometrically all of the water present in the aqueous acid to orthophosphoric acid and, in addition, to provide an excess of the phosphorus pentoxide within the range of from about 2 to 12, and preferably 4 to 10 percent, based upon the total weight of the ultimate mixture. The addition and mixing of the phosphorus pentoxide with the aqueous orthophosphoric acid may be effected in a variety of different ways with relatively comparable results. It is important, however, particularly to obtain a highly active catalyst mixture, to maintain the mixture, during the addition of the phosphorus pentoxide, at a temperature within the range of from 100° to about 150° C. and preferably within the range of from about 100° to about 130° C.

The conditions and procedures used in effecting the condensation reaction of propylene and 3,4-dihydrocoumarin in the presence of the catalyst mixture of this invention may be widely varied. It is important, however, that relatively elevated temperatures be used. Such temperatures may range from about 110° to 180° C. with a more limited range of from about 140° to 170° C. being preferred, particularly to maximize the product yield. The quantity of the catalyst mixture present may be varied and is dependent upon such factors as the condensation temperature and the reaction rate desired. Generally, a quantity of the catalyst mixture ranging from about 25 to 300 percent based upon the weight of the dihydrocoumarin reactant will be suitable under most circumstances, with a more limited range of from about 50 to 200 percent being conveniently utilized. The pressure at which the condensation is effected usually is not an important factor and atmospheric pressure is suitably used. The time required to effect the desired condensation will vary depending upon the reaction temperature and quantity of the catalyst mixture present. Usually, however, in a batch-type operation, the time required will normally range from about 10 to 20 hours. Conveniently, the progress of the condensation may be followed by observing the absorption of the propylene and when the desired amount of propylene has been absorbed, usually a slight stoichiometric excess of above about 2 mols of propylene per one mol of dihydrocoumarin, the reaction may be terminated.

The condensation reaction of this invention may be conducted in a batch- or continuous-type manner. A batch-type operation is preferred, however, and may be illustrated as follows. The desired quantity of aqueous orthophosphoric acid, for example, 85 weight percent acid, is charged to a suitable reaction vessel. While maintaining the temperature within the desired limits, a measured quantity of phosphorus pentoxide is added to form the catalyst mixture. The 3,4-dihydrocoumarin reactant is then charged to the vessel and the temperature is raised to the desired level. While maintaining the temperature, propylene is charged to the reactor at a controlled rate until the desired amount has been absorbed, at which point the reaction mixture is cooled. The diisopropyl dihydrocoumarin portion of the reaction mixture is then recovered by conventional means including solvent extraction and distillation. The diisopropyl-3,4-dihydrocoumarin product is ordinarliy a mixture of isomers such as 5,7-diisopropyl, 6,8-diisopropyl, or 6,7-diisopropyl. While the entire isomeric mixture may be used directly without further treatment for a variety of purposes, for example, as an odor ingredient of perfumes, the mixture usually is fractionated to recover the diisopropyl fraction, believed to be the 5,7-isomer, having the highly desirable musk-like odor.

The following examples are offered to illustrate the process of this invention. They are not intended, however, to limit the invention to the specific conditions or catalyst mixtures illustrated therein.

EXAMPLE I

Diisopropyl-3,4-dihydrocoumarin was prepared according to the process of this invention by the following procedure.

The catalyst mixture for the reaction was prepared by charging 500 grams of 85 weight percent orthophosphoric acid to a stirred reactor equipped with heating/cooling means and a gas inlet port. With stirring, the temperature was adjusted to about 100° C. and, while maintaining such temperature, 247.5 grams of phosphorus pentoxide were added over about ¼ hour. The stirring was continued for about ½ hour more to obtain a catalyst mixture of about 747.5 grams of substantially anhydrous orthophosphoric acid containing about 6.7 weight percent of phosphorus pentoxide. About 370 grams (2.5 mols) of 3,4-dihydrocoumarin were then charged to the reactor and into contact with the catalyst mixture with the temperature being raised to about 155° to 165° C. While maintaining the temperature, propylene gas was then charged to the reactor until about 6 mols of propylene had been absorbed, a period requiring about 14 hours. The reaction mixture was thereupon cooled to about 60° C. and 235 grams of hexane were added followed by 375 grams of water. The resultant organic layer was separated and washed first with water and then with aqueous sodium bicarbonate and finally with salt water. The washed mixture was then distilled to recover 561.3 grams of an isomeric product mixture of diisopropyl-3,4-dihydrocoumarin. The yield was 97 percent of theory based upon charged dihydrocoumarin. The isomeric product was further treated by vacuum fractionation to separate the isomer, believed to be the 5,7-isomer having the valuable musk-like odor. This isomer fraction weighed 299.6 grams and had a boiling point of from about 159° to 161° C. at 3 mm. Hg pressure and a refractive index $n_D^{20}$ of 1.5284 to 1.5287.

EXAMPLE II

Diisopropyl-3,4-dihydrocoumarin was prepared using polyphosphoric acid as catalyst according to the following procedure. The results obtained may be contrasted with those of Example I which represents the process of this invention.

The polyphosphoric acid used was represented to be 115 percent orthophosphoric acid. Assuming that the polyphosphoric acid is a mixture of substantially anhydrous orthophosphoric acid and phosphorus pentoxide, the weight percent of excess phosphorus pentoxide would be 39.4. About 220 grams of the polyphosphoric acid and 74 grams (0.5 mol) of 3,4-dihydrocoumarin were charged to a stirred reactor equipped with heating/cooling means and a gas inlet port. The temperature was raised to about 140° to 160° C. With stirring, propylene gas was charged to the reactor until about 2 mols had been absorbed, a period requiring about 15 hours. The reaction mixture at this point was a thick, dark slurry which presented very difficult handling problems. The mixture was cooled and water added with a resultant exothermic reaction. Benzene was added, but the mixture did not separate into the desired organic and aqueous layers. More water was added and a multiphase system resulted. A heavy, tarry, solid layer weighing about 10 grams was removed and an organic liquid layer was separated from the aqueous layer. The organic layer was washed with water, followed by washings with sodium bicarbonate solution and salt water. The mixture was then distilled to remove the benzene to recover about 64.1 grams of an isomeric diisopropyl dihydrocoumarin product mixture. The product yield, based upon the dihydrocoumarin was 55.3 percent of theory. The isomeric product was further treated by vacuum fractionation to separate about 25 grams of the fraction having a musk-like odor.

EXAMPLE III

The following two experiments, A and B, were conducted using different types of phosphoric acid catalysts for the condensation of propylene and dihydrocoumarin. In both instances the desired reactions did not take place:

(A) Aqueous orthophosphoric acid containing 85 weight percent acid

About 100 grams of the acid and 74 grams (½ mol) of 3,4-dihydrocoumarin were charged to a stirred reactor equipped with heating/cooling means and a gas inlet port. With stirring, the mixture was heated to about 140° C. and propylene was charged to the reactor. No reaction occurred as indicated by an absence of any absorption of the propylene.

(B) Substantially anhydrous orthophosphoric acid

The catalyst was prepared by charging 100 grams of aqueous orthophosphoric acid (85 weight percent acid) to a stirred reactor equipped with heating/cooling means and an inlet port. With stirring, the temperature was adjusted to about 100° C. and, while maintaining such temperature, 39.5 grams of phosphorus pentoxide were added to convert all of the water present to orthophosphoric acid. While the stirring was continued, 74 grams (0.5 mol) of 3,4-dihydrocoumarin were added and the temperature was raised to 110° to 120° C. Propylene was charged to the reactor but the reaction as indicated by the absorption of propylene (¹⁄₄₀ of a mol in 2 hours) was so slow that the reaction was terminated with negligible product formation.

I claim as my invention:

1. A process for preparing diisopropyl-3,4-dihydrocoumarins which comprises condensing propylene with 3,4-dihydrocoumarin at a temperature of from about 110° to 180° C. in the presence of a catalyst mixture consisting essentially of substantially anhydrous orthophosphoric acid and from about 2 to 12 percent of phosphorus pentoxide based upon the weight of the mixture, and thereafter recovering the desired product.

2. The process according to claim 1 characterized in that the catalyst mixture contains from about 4 to 10 percent of phosphorus pentoxide.

3. The process according to claim 1 characterized in that the temperature is from about 140° to 170° C.

4. The process according to claim 1 characterized in that the catalyst mixture is present in from about 25 to 300 percent based upon the weight of the dihydrocoumarin.

5. The process according to claim 1 characterized in that 5,7-diisopropyl-3,4-dihydrocoumarin is recovered as the product.

6. The process according to claim 1 characterized in that the catalyst mixture is prepared by adding phosphorus pentoxide to aqueous orthophosphoric acid in an amount adjusted to convert substantially all of the water present to orthophosphoric acid and to provide an excess of the phosphorus pentoxide of from about 2 to 12 percent based upon the weight of the mixture.

7. The process according to claim 6 characterized in that the phosphorus pentoxide is added to the aqueous orthophosphoric acid at a temperature of from about 100° to 150° C.

8. The process according to claim 6 characterized in that the phosphorus pentoxide is added in an amount adjusted so that the excess phosphorus pentoxide is from about 4 to 10 percent.

9. The process according to claim 6 characterized in that the catalyst mixture is prepared by adding phosphorus pentoxide to aqueous orthophosphoric acid containing about 85 weight percent acid at a temperature of from about 100° to 130° C. in an amount adjusted to convert all of the water present to orthophosphoric acid and to provide an excess of the phosphorus pentoxide of from about 4 to 10 percent based upon the weight of the mixture.

References Cited

UNITED STATES PATENTS

| 3,144,467 | 8/1964 | Houlihan | 260—343.2 |
| 3,258,400 | 6/1966 | Houlihan | 167—94 |

JAMES A. PATTEN, *Primary Examiner.*

U.S. Cl. X.R.

252—522